(12) United States Patent
Hirakawa et al.

(10) Patent No.: US 8,163,389 B2
(45) Date of Patent: Apr. 24, 2012

(54) CONDUCTIVE ROLL AND METHOD FOR PRODUCING SAME

(75) Inventors: Naoki Hirakawa, Yokohama (JP);
Koichi Shizuru, Yokohama (JP);
Makoto Iwamura, Yokohama (JP)

(73) Assignee: Synztec Co., Ltd, Tokyo (JP)

( * ) Notice: Subject to any disclaimer, the term of this patent is extended or adjusted under 35 U.S.C. 154(b) by 825 days.

(21) Appl. No.: 11/100,957

(22) Filed: Apr. 6, 2005

(65) Prior Publication Data

US 2005/0227089 A1    Oct. 13, 2005

(30) Foreign Application Priority Data

Apr. 8, 2004 (JP) ................. 2004-114696
Apr. 1, 2005 (JP) ................. 2005-106632

(51) Int. Cl.
*B23B 27/08* (2006.01)
*B32B 27/40* (2006.01)
*B01J 27/135* (2006.01)
*B01J 27/02* (2006.01)
*G03G 15/00* (2006.01)

(52) U.S. Cl. ........ 428/423.1; 528/48; 502/155; 399/176

(58) Field of Classification Search ............... 428/423.1; 528/15, 48; 399/176; 502/155
See application file for complete search history.

(56) References Cited

U.S. PATENT DOCUMENTS

| 5,659,854 | A  | * | 8/1997 | Masuda et al. ............. 399/176 |
| 6,013,690 | A  | * | 1/2000 | Coleman et al. ............ 521/128 |
| 6,384,171 | B1 | * | 5/2002 | Yamazaki et al. ........... 528/15  |
| 2005/0029693 | A1 | * | 2/2005 | Noda et al. .............. 264/46.9 |

FOREIGN PATENT DOCUMENTS

JP            2003202750        7/2003

* cited by examiner

*Primary Examiner* — James J Seidleck
*Assistant Examiner* — Saira B Haider
(74) *Attorney, Agent, or Firm* — Brian A. Gomez; Gomez Int'l Patent Office, LLC

(57) ABSTRACT

A conductive roll having at least one conductive elastic layer on the outer periphery of a core bar, the conductive elastic layer being granted conductivity by carbon black, is provided. The conductive elastic layer is prepared by reacting at least a polyol consisting essentially of a polyether-based polyol with a diisocyanate with the use of a tetravalent organotin-based compound having a tin content of 18.7% or less by weight as a catalyst. A method for producing the conductive roll is also provided.

8 Claims, 13 Drawing Sheets
(6 of 13 Drawing Sheet(s) Filed in Color)

EXAMPLE 1

EXAMPLE 2

EXAMPLE 3

COMPARATIVE EXAMPLE 3

COMPARATIVE EXAMPLE 4

COMPARATIVE EXAMPLE 5

EXAMPLE 1

EXAMPLE 3

COMPARATIVE EXAMPLE 2

COMPARATIVE EXAMPLE 4

COMPARATIVE EXAMPLE 5

CONDUCTIVE ROLL AND METHOD FOR PRODUCING SAME

BACKGROUND OF THE INVENTION

1. Field of the Invention

This invention relates to a conductive roll for use in imparting a uniform charge to a photoconductor or the like of image forming machines, such as an electrophotographic copying machine and a printer, or a toner jet copying machine and a printer. The invention also relates to a method for producing the conductive roll.

2. Description of the Related Art

A conductive roll of an ionic conduction type, which has an alkali metal salt, such as lithium perchlorate, added to urethane, has so far been used as a cast urethane type conductive roll. However, it is highly environment-dependent in that its electrical resistance varies according to an environment, such as temperature and humidity. Thus, a conductive roll of an electronic conduction type, which has conductive carbon black added to urethane, is under consideration (see, for example, Japanese Patent Application Laid-Open No. 2003-202750 (claims, etc.)).

In the electronic conduction type conductive roll, uniform distribution of carbon black in urethane rubber is essential for obtaining a satisfactory image. During the forming of urethane, however, reaggregation of carbon black due to heat occurs along with a urethane reaction. Thus, differences arise in the distribution of carbon black in the urethane, causing nonuniformity to the electrical resistance value of the conductive roll. As a result, a printing product obtained by printing with the use of this conductive roll tends to have a poor image. Thus, it is necessary to cure urethane earlier than the reaggregation of carbon black, thereby containing the movements of carbon black so that a uniform distribution of carbon black will be obtained. For this purpose, the temperatures of the raw materials for urethane, the temperature of a mold for the forming of urethane, and a catalyst for use in the urethane reaction are changed, whereby the rate of the urethane reaction is controlled.

However, when the mold for use in the forming of urethane is brought to a high temperature, and urethane is formed at this high temperature, the viscosity of the raw materials for urethane decreases in the vicinity of the mold surface because of heat, accelerating the aggregation of carbon black. As a result, a uniform distribution of carbon black is not obtained. If the amount of the catalyst is increased, on the other hand, the reaction rapidly proceeds, starting in a stage where the raw materials for urethane are mixed, with the result that these raw materials thicken. Thus, when the raw materials are charged into the mold, bubbles tend to be entrapped, and urethane is cured unchanged, presenting a high possibility for occurrence of pinholes. In conclusion, it is very difficult to control the urethane reaction so that a uniform distribution of carbon black is obtained.

SUMMARY OF THE INVENTION

The present invention has been accomplished in light of the above-described circumstances. An object of the present invention is to provide a conductive roll minimally environment-dependent and having carbon black uniformly dispersed therein, by suppressing the entrapment of bubbles due to the thickening of materials for urethane in the initial stage of a urethane reaction, and also by curing urethane before reaggregation of carbon black upon heating; and to provide a method for producing the conductive roll.

A first aspect of the present invention for attaining the above object is a conductive roll having at least one conductive elastic layer on the outer periphery of a core bar. The conductivity of the elastic layer being can be provided by carbon black. The conductive elastic layer is characterized in that it is prepared by reacting at least one polyol consisting essentially of a polyether-based polyol with a diisocyanate with the use of a tetravalent organotin-based compound having a tin content of 18.7% or less by weight as a catalyst.

A second aspect of the conductive roll of the present invention according to the first aspect is characterized in that the weight of the organotin-based compound is 0.001 to 0.05% by weight based on the polyol.

A third aspect of the conductive roll of the present invention according to the first or second aspect is characterized in that the organotin-based compound is a compound having sulfur atoms bound adjacent to tin atoms.

A fourth aspect of the conductive roll of the present invention according to any one of the first to third aspects is characterized by including a surface treatment layer on the surface of the conductive elastic layer, the surface treatment layer being formed by surface treatment with a surface treating solution containing at least an isocyanate component.

A fifth aspect of the conductive roll of the present invention according to the fourth aspect is characterized in that the surface treating solution further contains at least one of carbon black and at least one polymer selected from the group consisting of an acrylic fluorine-based polymer and an acrylic silicone-based polymer.

A sixth aspect of the conductive roll of the present invention according to any one of the first to fifth aspects is characterized in that the relation between a resistance component $Zr$ ($\Omega$) and a capacitive reactance component $Zc$ ($\Omega$) calculated from impedance $Z$ ($\Omega$) when an alternating voltage of 0.2 V having a frequency of 1 Hz is applied to said conductive elastic layer satisfies the following equation:

$$25 \geq Zr/Zc \geq 5$$

A seventh aspect of the present invention for attaining the above object is a method for producing a conductive roll having at least one conductive elastic layer on the outer periphery of a core bar, the conductive elastic layer being granted conductivity by carbon black, and which comprises reacting a polyol consisting essentially of a polyether-based polyol with a diisocyanate in the presence of a tetravalent organotin-based compound having a tin content of 18.7% or less by weight to prepare the conductive elastic layer.

An eighth aspect of the method for producing the conductive roll of the present invention according to the seventh aspect is characterized in that the catalytic amount of the organotin-based compound is 0.001 to 0.05% by weight based on the polyol.

A ninth aspect of the method for producing the conductive roll of the present invention according to the seventh or eighth aspect is characterized in that the organotin-based compound is a compound having sulfur atoms bound adjacent to tin atoms.

A tenth aspect of the method for producing the conductive roll of the present invention according to any one of the seventh to ninth aspects is characterized by including the step of forming a surface treatment layer on the surface of the conductive elastic layer by surface treatment with a surface treating solution containing at least an isocyanate component.

An eleventh aspect of the method for producing the conductive roll of the present invention according to the tenth aspect is characterized in that the surface treating solution further contains at least one of carbon black and at least one polymer selected from the group consisting of an acrylic fluorine-based polymer and an acrylic silicone-based polymer.

A twelfth aspect of the method for producing the conductive roll of the present invention according to any one of the seventh to eleventh aspects is characterized in that the relation between a resistance component $Zr$ ($\Omega$) and a capacitive reactance component $Zc$ ($\Omega$) calculated from impedance $Z$ ($\Omega$) when an alternating voltage of 0.2 V having a frequency of 1 Hz is applied to said conductive elastic layer satisfies the following equation:

$$25 \geq Zr/Zc \geq 5$$

In the present invention, the tetravalent organotin-based compound having a tin content of 18.7% or less by weight is used as a catalyst in the reaction between the polyol consisting essentially of a polyether-based polyol, which has carbon black added as a conducting agent, and the diisocyanate. These features suppress the entrapment of bubbles due to the thickening of materials for urethane in the initial stage of a urethane reaction, and also cure urethane before reaggregation of carbon black upon heating. By so doing, the present invention is arranged to provide a conductive roll minimally environment-dependent and having carbon black uniformly dispersed therein, and provide a method for producing the conductive roll.

The above-described conductive roll of the present invention is different from a conductive roll prepared by using a tetravalent organotin-based compound having a tin content of more than 18.7% by weight as a catalyst during the reaction between a polyol consisting essentially of a polyether-based polyol and a diisocyanate. That is, the use of a tetravalent organotin-based compound having a tin content of more than 18.7% by weight is defective in that the entrapment of bubbles occurs owing to the thickening of the materials for urethane in the initial stage of a urethane reaction, resulting in the ununiform distribution of carbon black. When the catalyst having a less tin content as in the present invention is used, it is assumed that urethane can be cured before reaggregation of carbon black upon heating, with bubbles being inhibited from being entrapped owing to the thickening of the raw materials in the initial stage of the reaction.

Examples of the catalyst used in the present invention include NEOSTAN U-340 (NITTO KASEI) and NEOSTAN U-360 (NITTO KASEI). Of course, these catalysts are not restrictive, and any catalysts satisfying the above-mentioned conditions and having a tin content of 18.7% or less by weight can be used. Since NEOSTAN U-340 and NEOSTAN U-360 have sulfur atoms bound adjacent to tin atoms, they are preferred to tetravalent organotin-based compounds having a tin content of 18.7% or less by weight in which sulfur atoms are not bound adjacent to tin atoms. The use of the catalyst having sulfur atoms bound adjacent to tin atoms is presumed to increase steric hindrance to the reaction and further slow the reaction rate of urethane. Consequently, the entrapment of bubbles is further suppressed, whereby urethane having carbon black dispersed more uniformly therein can be obtained.

The matrix of the conductive roll according to the present invention is polyurethane consisting essentially of a polyether-based polyol. The polyurethane is preferably thermosetting polyurethane obtained by reacting a polyether-based polyol having an average functional group number of 2.5 or more per molecule with a polyisocyanate having an average functional group number of more than 2 per molecule at an NCO/OH mol ratio of less than 1.

The ether-based polyurethane used preferably in the method of the present invention is a so-called cast type polyurethane obtained by reacting a polyol consisting essentially of an ether-based polyol with a polyisocyanate.

Examples of the isocyanate to be reacted with the polyol are trifunctional isocyanates as single substances, such as triphenylmethane triisocyanate, tris(isocyanatophenyl) thiophosphate, and bicycloheptane triisocyanate, and mixtures of nurate-modified polyisocyanates of hexamethylene diisocyanate (trimer: trifunctional, pentamer: tetrafunctional) and polymeric MDI. Also, mixtures of polyisocyanates having trifunctionality or higher functionality and general bifunctional isocyanate compounds may be used. Examples of the bifunctional isocyanate compounds are 2,4-toluene diisocyanate (TDI), 4,4'-diphenylmethane diisocyanate (MDI), p-phenylene diisocyanate (PPDI), 1,5-naphthalene diisocyanate (NDI), and 3,3-dimethyldiphenyl-4,4'-diisocyanate (TODI), modification products such as prepolymers having these isocyanates at both terminals, and multimers of them.

Carbon black usable in the present invention is not limited, and conductive carbon black, carbon graphite, carbon nanotube, etc., for example, can be used.

The conductive roll of the present invention has a surface treatment layer provided integrally on the surface of the conductive elastic layer. This surface treatment layer is formed by impregnating the surface of the conductive elastic layer with a surface treating solution containing, mainly, an isocyanate compound dissolved in an organic solvent, and curing the impregnated solution. Thus, the surface treatment layer is integrally formed so as to become gradually sparse from the surface toward the interior. Hence, there can be provided a conductive roll preferred as a charging member which does not contaminate the organic photoconductor even upon contact therewith, which is minimal in the environment-dependency of electrical characteristics, and which is excellent in filming resistance of a toner component.

The surface treating solution may be that containing an isocyanate compound as a main component, and may incorporate at least one of a conductivity imparting agent and at least one polymer selected from acrylic fluorine-based polymers and acrylic silicone-based polymers.

As the isocyanate compound, there can be named 2,6-tolylene diisocyanate (TDI), 4,4'-diphenylmethane diisocyanate (MDI), p-phenylene diisocyanate (PPDI), 1,5-naphthalene diisocyanate (NDI), and 3,3-dimethyldiphenyl-4,4'-diisocyanate (TODI), and the aforementioned multimers and modification products.

The acrylic fluorine-based polymer and the acrylic silicone-based polymer are those which are soluble in predetermined solvents, and which can be chemically bound to the isocyanate compound upon reaction therewith. The acrylic fluorine-based polymer is, for example, a solvent-soluble fluorine-based polymer having a hydroxyl group, an alkyl group or a carboxyl group, and its examples are block copolymers of acrylic esters and fluoroalkyl acrylates, and derivatives thereof. The acrylic silicone-based polymer is a solvent-soluble silicone-based polymer, and its examples are block copolymers of acrylic esters and siloxane acrylate, and derivatives thereof.

If such polymers are used singly or as a mixture of two or more in the surface treating solution during surface treatment according to the present invention, the polymer in the surface treating solution is preferably in an amount of 2 to 30% by weight based on the isocyanate component. If the polymer content is low, the effect of holding carbon black in the surface treatment layer is diminished. If the polymer content is too high, the isocyanate component is relatively decreased in amount, and an effective surface treatment layer cannot be formed.

In the surface treating solution, carbon black is used as a conducting agent. The type of the carbon black is not limited, and KETJENBLACK (Lion Corp.) and TOKABLACK #5500 (TOKAI CARBON) can be named as examples. Carbon black in the surface treating solution is preferably 10 to 40% by weight based on the isocyanate component. If the carbon content is less than 10% by weight, effective conductivity characteristics cannot be shown. If the carbon content is too high, an undesirable problem such as exfoliation occurs.

The surface treating solution further contains a solvent which dissolves the above-mentioned acrylic fluorine-based polymer or the acrylic silicone-based polymer, and the isocyanate compound. The solvent is not limited, and an organic solvent, such as ethyl acetate, methyl ethyl ketone (MEK) or toluene, may be used.

Close observation of the dispersed state of a fine carbon powder gave the following findings: In a somewhat poor dispersed state, fine carbon powder locally aggregates, with the result that rubber regions free from carbon are present. The presence or absence of such carbon-free rubber regions exerts little influence on the value of electrical conductivity. However, a change occurs in the capacitive reactance component of impedance.

That is, the conductive roll of the present invention has a conductive rubber elastic layer such that the relation between a resistance component $Zr$ ($\Omega$) and a capacitive reactance component $Zc$ ($\Omega$) calculated from impedance $Z$ ($\Omega$) when an alternating voltage of 0.2 V having a frequency of 1 Hz is applied satisfies $25 \geq Zr/Zc \geq 5$, preferably, $25 \geq Zr/Zc \geq 10$. The conductive roll of the present invention may be of a one-layer structure or a two-layer structure, if it has such a conductive rubber elastic layer. Even if it has a protective layer or a high resistance layer on the surface for the purpose of preventing contamination or preventing leak, the relation between a resistance component $Zr$ ($\Omega$) and a capacitive reactance component $Zc$ ($\Omega$) calculated from impedance $Z$ ($\Omega$) when an alternating voltage of 0.2 V having a frequency of 1 Hz is applied satisfies $25 \geq Zr/Zc \geq 5$, if the rubber elastic layer below the protective layer or the high resistance layer fulfills the conditions described above. If the rubber elastic layer comprises polyurethane, and the surface treatment layer formed by surface treatment with the surface treating solution containing isocyanate is provided on the surface of the rubber elastic layer, it goes without saying that the rubber elastic layer rid of the surface treatment layer satisfies the aforementioned conditions. However, the rubber elastic layer itself, which has the surface treatment layer provided thereon, is preferably such that the relation between a resistance component $Zr$ ($\Omega$) and a capacitive reactance component $Zc$ ($\Omega$) calculated from impedance $Z$ ($\Omega$) when an alternating voltage of 0.2 V having a frequency of 1 Hz is applied satisfies $25 \geq Zr/Zc \geq 5$.

According to the present invention, a conductive roll minimally environment-dependent and having carbon black uniformly dispersed therein can be provided by suppressing the entrapment of bubbles due to the thickening of materials for urethane in the initial stage of a urethane reaction, and also by curing urethane before reaggregation of carbon black upon heating. A method for producing the conductive roll can also be provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present invention and the advantages thereof, reference is now made to the following descriptions in conjunction with the accompanying drawings.

DESCRIPTION OF THE PREFERRED EMBODIMENTS

Figure 1:
FIG. 1 is an enlarged photograph of a cross section of a conductive roll according to Example 1 of the present invention.

The present invention will now be described in detail based on the embodiments offered below. Descriptions in these embodiments are illustrative, and the features of the present invention are not limited to the following descriptions.

Example 1

Method for Production of Roll

Three parts by weight of VULCAN XC (Cabot Corp.) was added as a conducting agent to 100 parts by weight of PP-2000 (SANYO CHEMICAL INDUSTRIES) as a polyether-based polyol, and dispersed until a particle size of 20 µm or less was reached. To the mixture, 0.01 part by weight of NEOSTAN U-340 (dibutyltin bisisononyl-3-mercaptopropionate, NITTO KASEI), which is a tetravalent organotin-based catalyst and has a tin content of 16.5% by weight, was added as a curing catalyst. The mixture was temperature-controlled to 80° C., and then defoamed and dehydrated for 6 hours under reduced pressure to obtain an A solution. Separately, 4 parts by weight of diphenylmethane diisocyanate and 12 parts by weight of Colonate C-HX (Nippon Polyurethane Industry) were added to and mixed with 20 parts by weight of SF8427 (Dow Corning Toray Silicone). The mixture was reacted for 15 minutes at 120° C., and temperature-controlled to 80° C. to obtain a B solution. The A solution and the B solution were mixed, and poured into a mold preheated to 120° C. and having a shaft (φ: 8 mm, length: 270 mm) disposed therein. In the mold, the mixture was heated for 60 minutes at 120° C. to obtain a roll having a conductive polyurethane layer formed on the shaft surface except for both end portions of the shaft. The surface of the resulting conductive roll was polished by 1.5 mm, whereby the outer diameter of the roll was adjusted to 20 mm.

<Preparation of Surface Treating Solution>

Fifty parts by weight of KF-6001 (Shin-Etsu Chemical) and 20 parts by weight of MR400 (Nippon Polyurethane Industry) were added and mixed together, and reacted for 15 minutes at 120° C. Then, the reaction mixture was dissolved in 180 parts by weight of ethyl acetate, and 3 parts by weight of acetylene black (DENKI KAGAKU KOGYO) was dispersed in and mixed with the solution for 3 hours by means of a ball mill to prepare a surface treating solution. The siloxane bond units in the solutes of this solution were about 60% by weight.

<Surface Treatment of Roll>

The above roll was dipped for 30 seconds in the surface treating solution kept at 20° C., and was then heated for 10 hours in an oven held at 100° C. to form a surface treatment layer. The roll with the surface treatment layer was taken as the conductive roll of Example 1.

Example 2

Method for Production of Roll

Four parts by weight of TOKABLACK #5500 (TOKAI CARBON) and 3 parts by weight of VULCAN XC (Cabot Corp.) were added to 100 parts by weight of GP-3000 (SANYO CHEMICAL INDUSTRIES) as a trifunctional polyether-based polyol, and dispersed until a particle size of 20 μm or less was reached. To the mixture, 0.01 part by weight of NEOSTAN U-340 (dibutyltin bisisononyl-3-mercaptopropionate, NITTO KASEI), which is a tetravalent organotin-based catalyst and has a tin content of 16.5% by weight, was added as a curing catalyst. The mixture was temperature-controlled to 80° C., and then defoamed and dehydrated for 6 hours under reduced pressure to obtain a C solution. Separately, 11 parts by weight of Colonate C-HX (Nippon Polyurethane Industry) was added to and mixed with 25 parts by weight of Prepolymer Adiprene L100 (UNIROYAL), and the mixture was temperature-controlled to 80° C. to obtain a D solution. The C solution and the D solution were mixed, and poured into a φ23 mm iron pipe mold preheated to 110° C. and having a shaft (φ: 8 mm, length: 270 mm) disposed in the center and also having a polypropylene extruded tube (outer diameter 23 mm, thickness 0.2 mm) inserted in intimate contact with the inner wall surface of the mold. In the mold, the mixture was heated for 120 minutes at 110° C. to obtain a roll having a conductive polyurethane layer formed on the shaft surface except for both end portions of the shaft. The surface of the resulting conductive roll was polished by 1.5 mm, whereby the outer diameter of the roll was adjusted to 20 mm.

<Preparation of Surface Treating Solution>

Ethyl acetate (100 parts by weight), 3 parts by weight of acetylene black (DENKI KAGAKU KOGYO), and 2 parts by weight of acrylic fluoropolymer (NOVAFUSSO, a product of Dainipponshikizai) were dispersed and mixed for 3 hours by means of a ball mill. Then, 20 parts by weight of an isocyanate compound (MDI) was added to, mixed with and dissolved in the mixture to prepare a surface treating solution.

<Surface Treatment of Roll>

The above roll was dipped for 10 seconds in the surface treating solution kept at 20° C., and was then heated for 1 hour in an oven held at 120° C. to form a surface treatment layer. The roll with the surface treatment layer was taken as the conductive roll of Example 2.

Example 3

A conductive roll of Example 3 was produced in the same manner as in Example 2, except that 0.01 part by weight of U-360 (dibutyltin bisisooctylthioglycollate, NITTO KASEI), which is a tetravalent organotin-based compound and has a tin content of 18.7%, was added as a curing catalyst instead of NEOSTAN U-340.

Comparative Example 1

A conductive roll of Comparative Example 1 was produced in the same manner as in Example 1, except that 0.1 part by weight of lithium perchlorate was added instead of VULCAN XC.

Comparative Example 2

A conductive roll of Comparative Example 2 was produced in the same manner as in Example 1, except that 0.01 part by weight of NEOSTAN U-100 (dibutyltin dilaurate, NITTO KASEI), which is a tetravalent organotin-based compound and has a tin content of 18.8%, was added as a curing catalyst instead of NEOSTAN U-340.

Comparative Example 3

A conductive roll of Comparative Example 3 was produced in the same manner as in Example 1, except that 0.01 part by weight of NEOSTAN U-28 (tin octylate, NITTO KASEI), which is a divalent organotin-based compound and has a tin content of 28.5% by weight, was added as a curing catalyst instead of NEOSTAN U-340.

Comparative Example 4

A conductive roll of Comparative Example 4 was produced in the same manner as in Example 2, except that 0.01 part by weight of NEOSTAN U-100 (dibutyltin dilaurate, NITTO KASEI), which is a tetravalent organotin-based compound and has a tin content of 18.8%, was added as a curing catalyst instead of NEOSTAN U-340.

Comparative Example 5

A conductive roll of Comparative Example 5 was produced in the same manner as in Example 2, except that 0.01 part by weight of U-600 (bismuth tris(2-ethylhexanoate):2-ethylhexanoic acid=55-58%:42-45%, NITTO KASEI), which is an organobismuth-based composition, was added as a curing catalyst instead of NEOSTAN U-340.

Test Example 1

Image Evaluation

The conductive roll of each of the above Examples and Comparative Examples was mounted as a developing roll in a commercially available printer. Printing was performed in an LL environment (10° C., 30% RH), an NN environment (25° C., 50% RH), and an HH environment (35° C., 85% RH), and image evaluation of the resulting printing products was made. The results are shown in Table 1.

TABLE 1

| Environment | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|
| LL | o | o | o | □ Insufficient printing | x | x Variations in printing density | □ | x |
| NN | o | o | o | o | x | □ | □ | x |
| HH | o | o | o | x Fogging | x | □ | □ | x | o: Satisfactory image
□: Slightly unsatisfactory image
x: Unsatisfactory image

As shown in Table 1, the conductive rolls of Examples 1 to 3 were minimal in environment dependency. Thus, the images of the printing products prepared using these conductive rolls as the developing rolls obtained good evaluations in the respective environments.

On the other hand, the conductive roll of Comparative Example 1 was highly environment-dependent. Thus, the image of the printing product prepared using this conductive roll as the developing roll obtained a good evaluation in the NN environment, but obtained an evaluation "slightly unsatisfactory" because of insufficient printing in the LL environment, and obtained an evaluation "unsatisfactory" because of fogging in the HH environment.

In the case of the conductive roll of Comparative Example 2, the initial reaction rate was so high that the roll was formed, with bubbles being entrapped therein. Thus, the image of the printing product prepared using this conductive roll as the developing roll obtained an evaluation "unsatisfactory" in all of the environments.

With the conductive roll of Comparative Example 3, the amount of the catalyst (NEOSTAN U-28) decreased because of vaporization of the catalyst during the vacuum dehydration step in the process for preparing the A solution. In accordance with the decrease in the amount of the catalyst, the rate of the urethane reaction became slower, so that carbon black aggregated because of heat before curing of urethane. As a result, carbon black was unevenly dispersed. Consequently, the image of the printing product prepared using this conductive roll as the developing roll obtained an evaluation "unsatisfactory" because of variations in the printing density in the LL environment, and obtained evaluations "slightly unsatisfactory" in the NN environment and the HH environment.

The conductive roll of Comparative Example 4 was formed with the use of the polypropylene extruded tube. Thus, entrapment of bubbles as in Comparative Example 2 did not occur. However, a long time was taken until carbon black was fixed with polyurethane in the progress of the reaction. Thus, probably because of reaggregation of carbon black, evaluations "slightly unsatisfactory" were obtained in all of the environments.

With the conductive roll of Comparative Example 5 as well, the reaction rate was so slow that reaggregation of carbon black occurred. Thus, the evaluations were "unsatisfactory" in all of the environments.

Test Example 2

Dispersion Evaluation of Carbon Black

The cross sections of the conductive rolls of Examples 1 to 3 and Comparative Examples 2 to 5 were observed microscopically to evaluate the degree of dispersion of carbon black in the vicinity of the surface of each developing roll. The results are shown in Table 2. Enlarged photographs of the cross sections of the conductive rolls of Examples 1 to 3 and Comparative Examples 3 to 5 are shown in FIGS. 1 to 6.

TABLE 2

Figure 2:
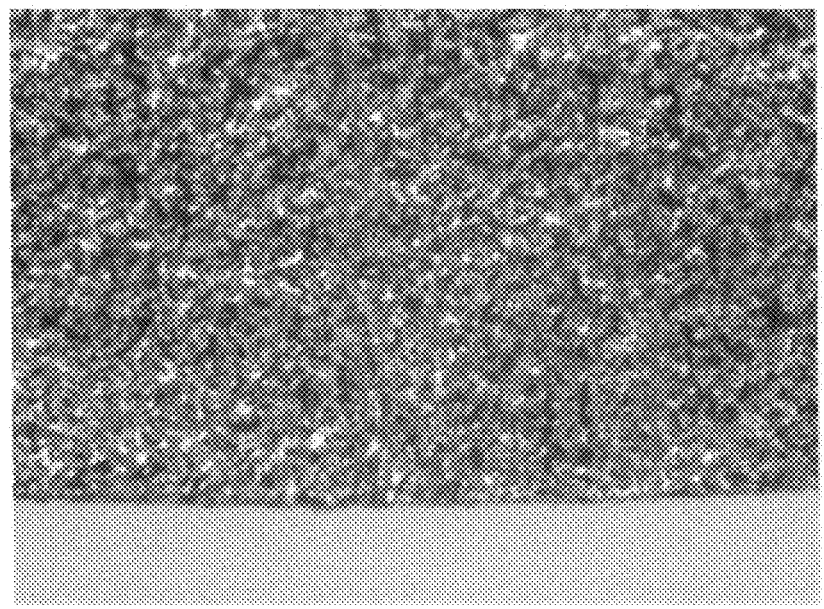
FIG. 2 is an enlarged photograph of a cross section of a conductive roll according to Example 2 of the present invention.
Figure 3:
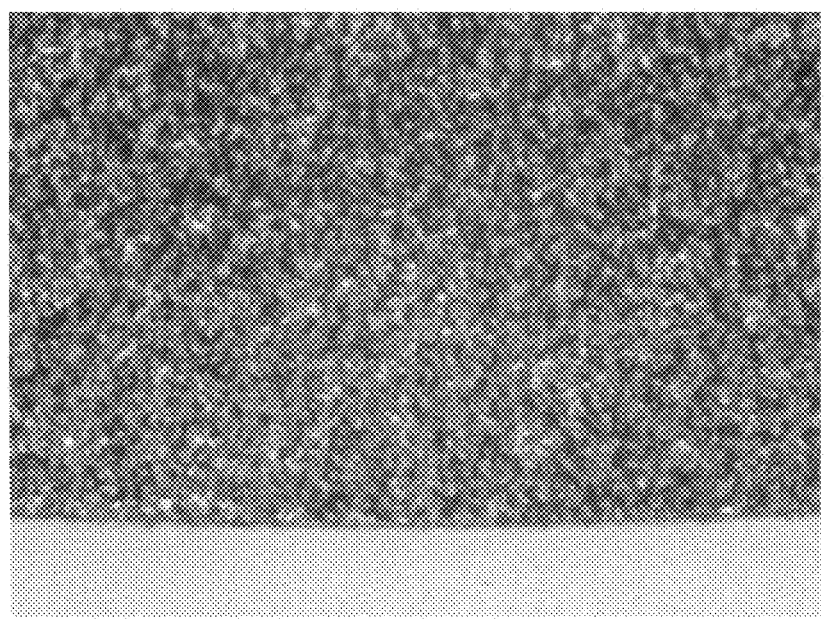
FIG. 3 is an enlarged photograph of a cross section of a conductive roll according to Example 3 of the present invention.

| | Ex. 1 | Ex. 2 | Ex. 3 | Comp. Ex. 2 | Comp. Ex. 3 | Comp. Ex. 4 | Comp. Ex. 5 |
|---|---|---|---|---|---|---|---|
| Dispersed state of carbon | o | o | o | x Pinholes occurred | □ | □ | x | o: Dispersed uniformly
□: Dispersed slightly ununiformly
x: Dispersed ununiformly As shown in Table 2, the conductive rolls of Examples 1 to 3 obtained evaluations indicating uniform dispersion of carbon black. Concretely, carbon black was uniformly dispersed, as shown in FIGS. 1 to 3.

On the other hand, the conductive roll of Comparative Example 2 involved occurrence of pinholes, and obtained an evaluation indicating ununiform dispersion of carbon black.

Figure 4:
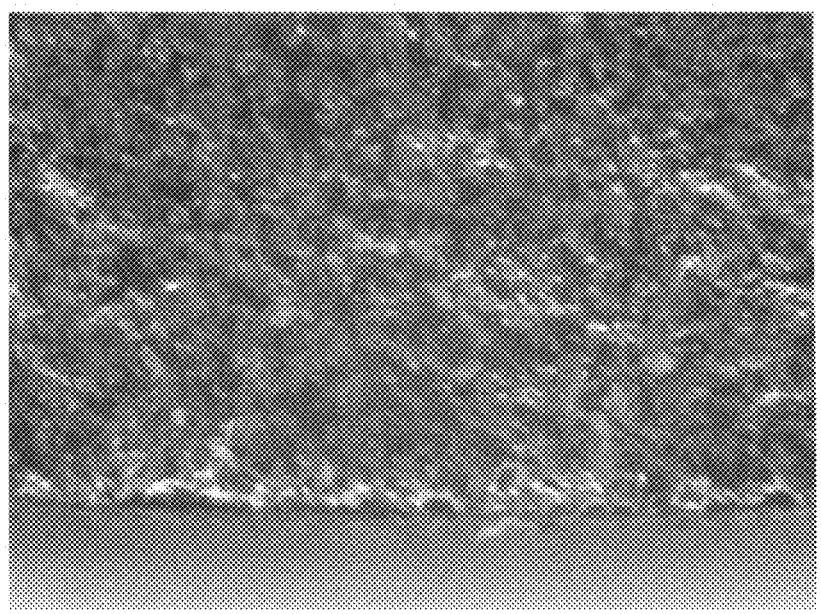
FIG. 4 is an enlarged photograph of a cross section of a conductive roll according to Comparative Example 3.
Figure 5:
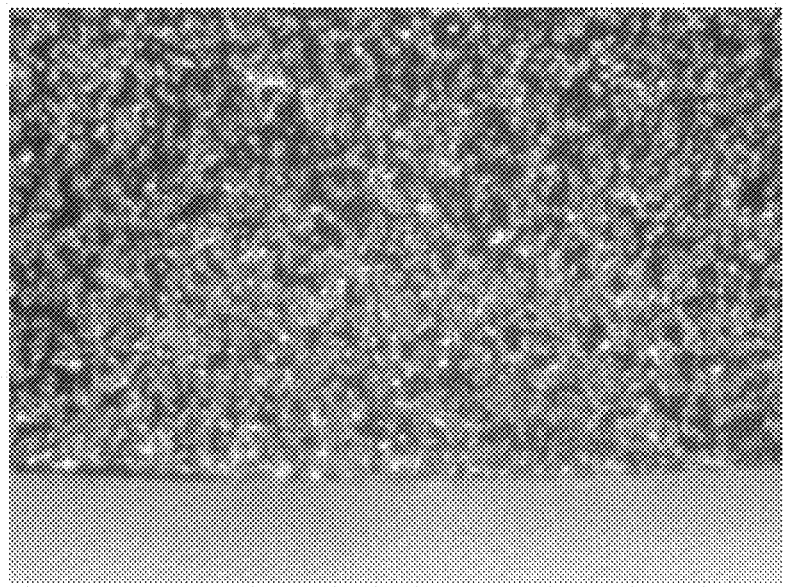
FIG. 5 is an enlarged photograph of a cross section of a conductive roll according to Comparative Example 4.

The conductive rolls of Comparative Examples 3 and 4 obtained evaluations indicating slightly ununiform dispersion of carbon black. Concretely, carbon black was not uniformly dispersed, as shown in FIGS. 4 and 5.

Figure 6:
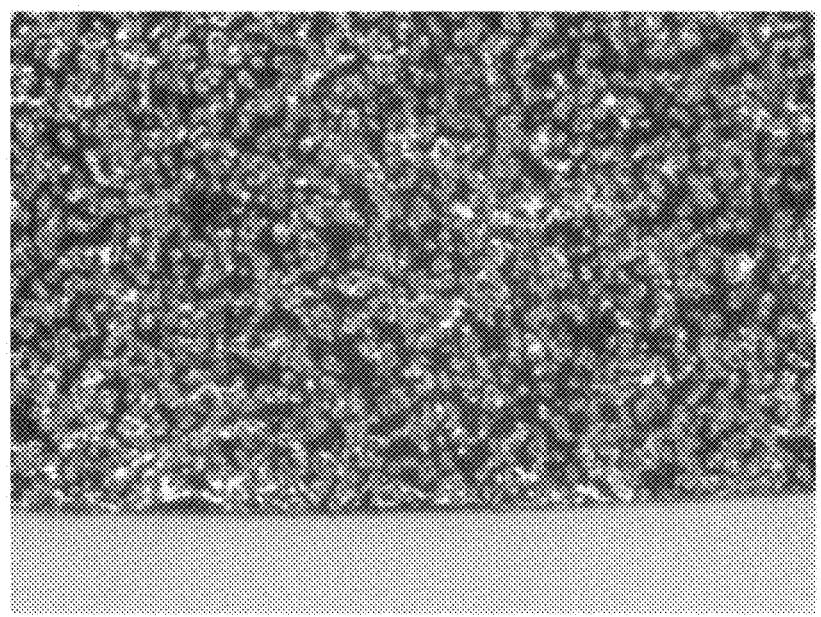
FIG. 6 is an enlarged photograph of a cross section of a conductive roll according to Comparative Example 5.
Figure 7:
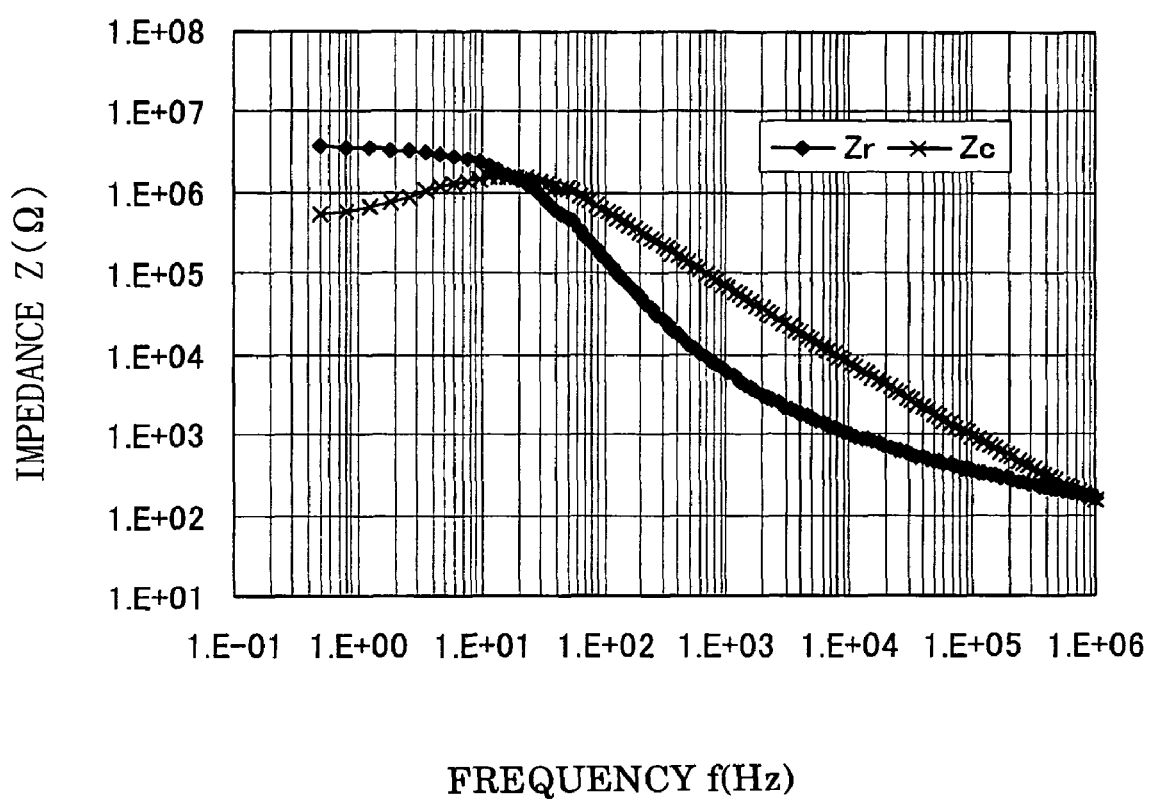
FIG. 7 is a view showing the frequency characteristics of an untreated product of Example 1 of the present invention.
Figure 8:
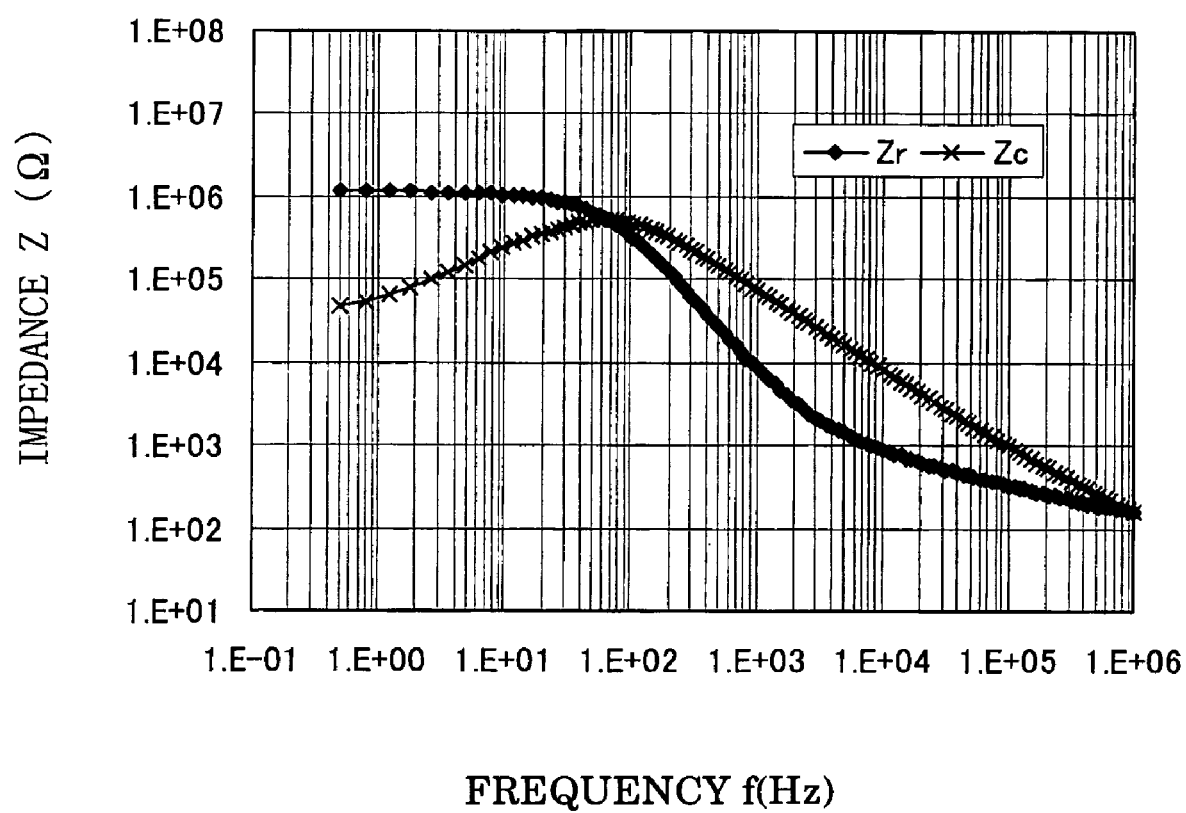
FIG. 8 is a view showing the frequency characteristics of an untreated product of Example 2 of the present invention.
Figure 9:
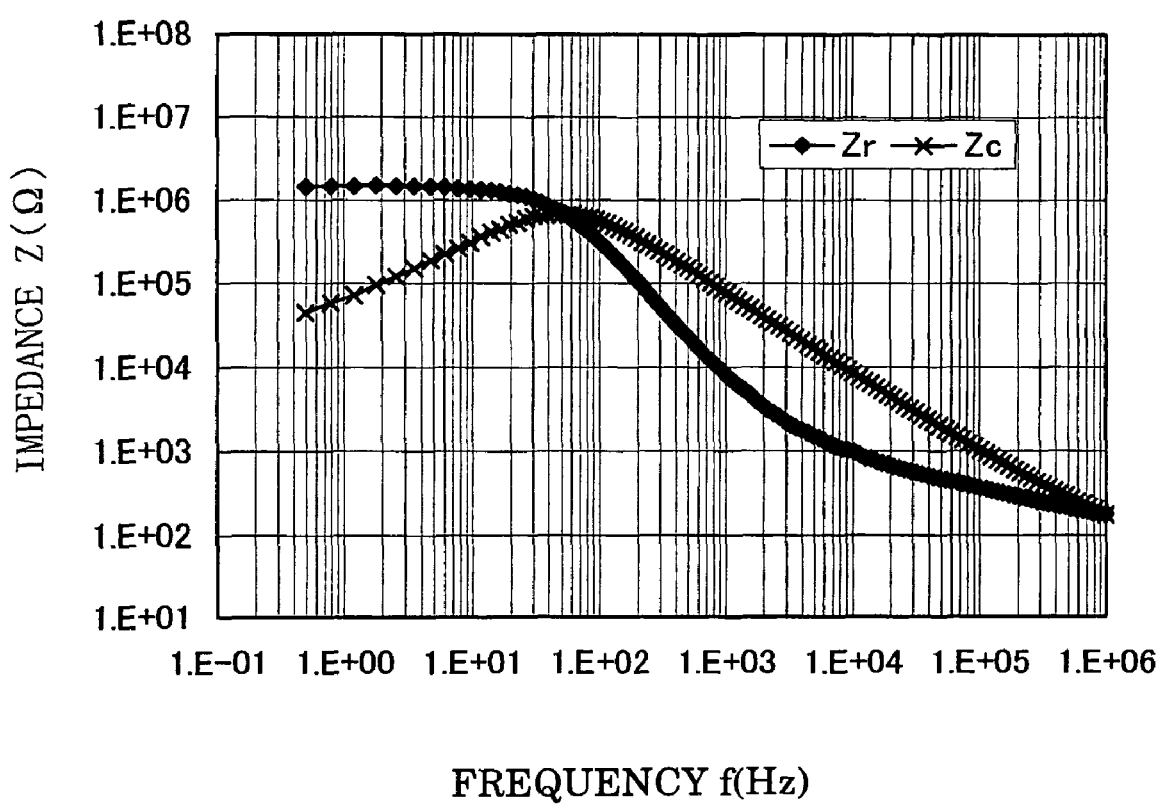
FIG. 9 is a view showing the frequency characteristics of an untreated product of Example 3 of the present invention.
Figure 10:
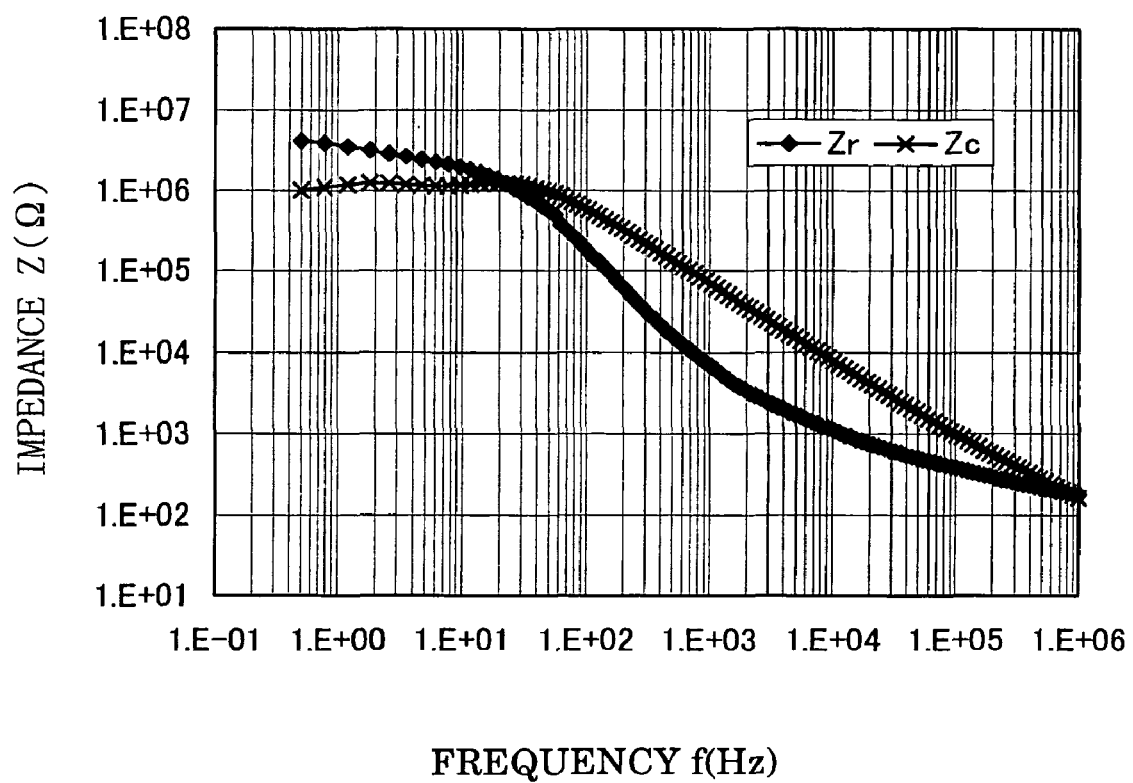
FIG. 10 is a view showing the frequency characteristics of an untreated product of Comparative Example 2.
Figure 11:
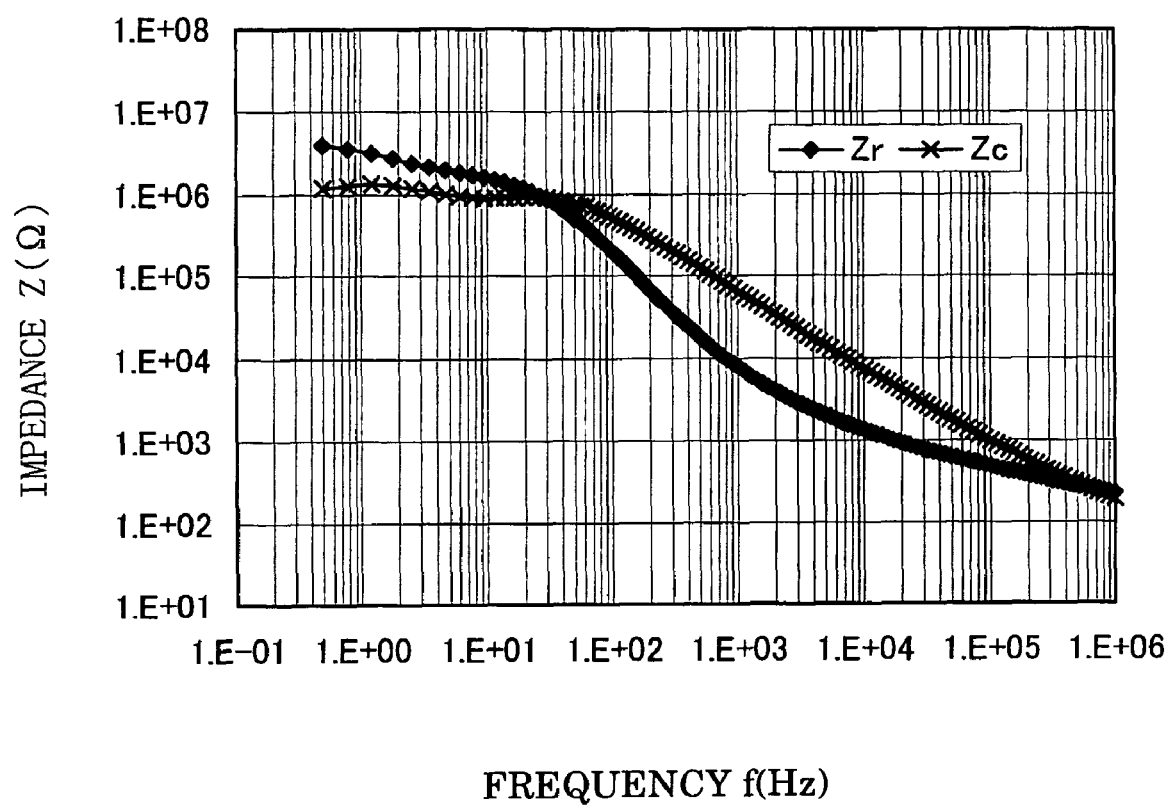
FIG. 11 is a view showing the frequency characteristics of an untreated product of Comparative Example 3.
Figure 12:
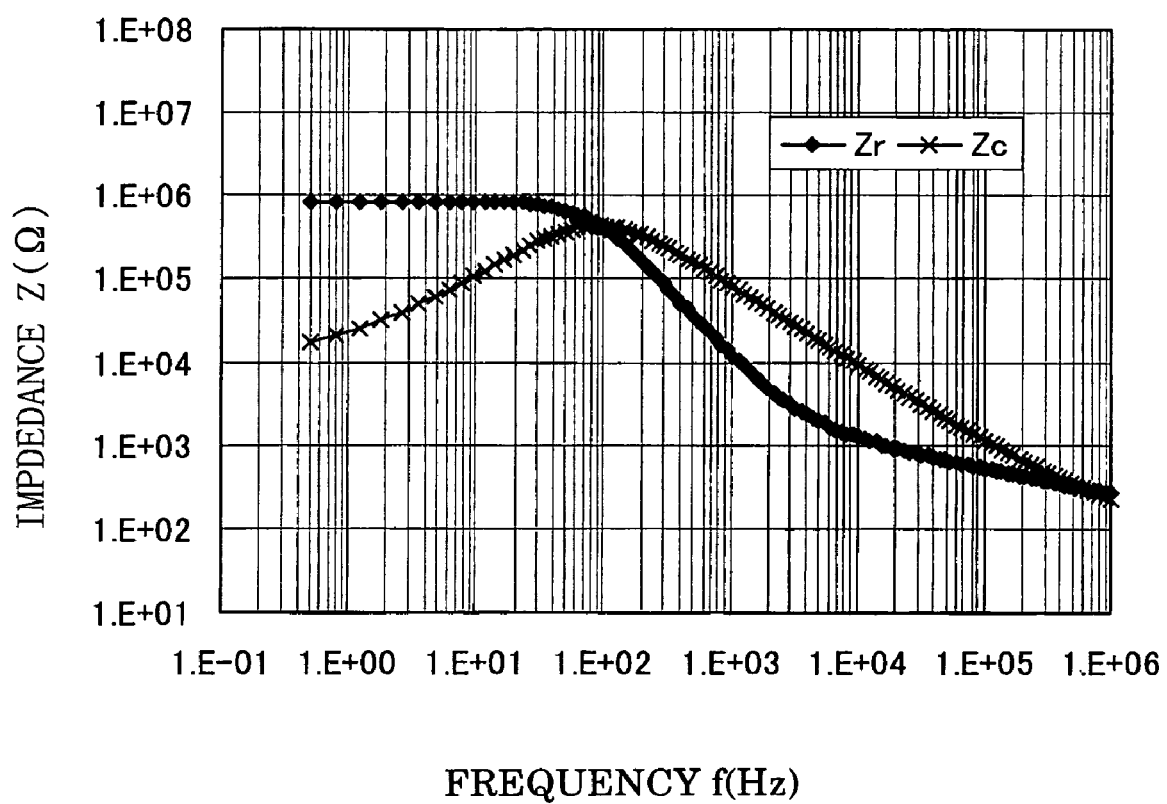
FIG. 12 is a view showing the frequency characteristics of an untreated product of Comparative Example 4.
Figure 13:
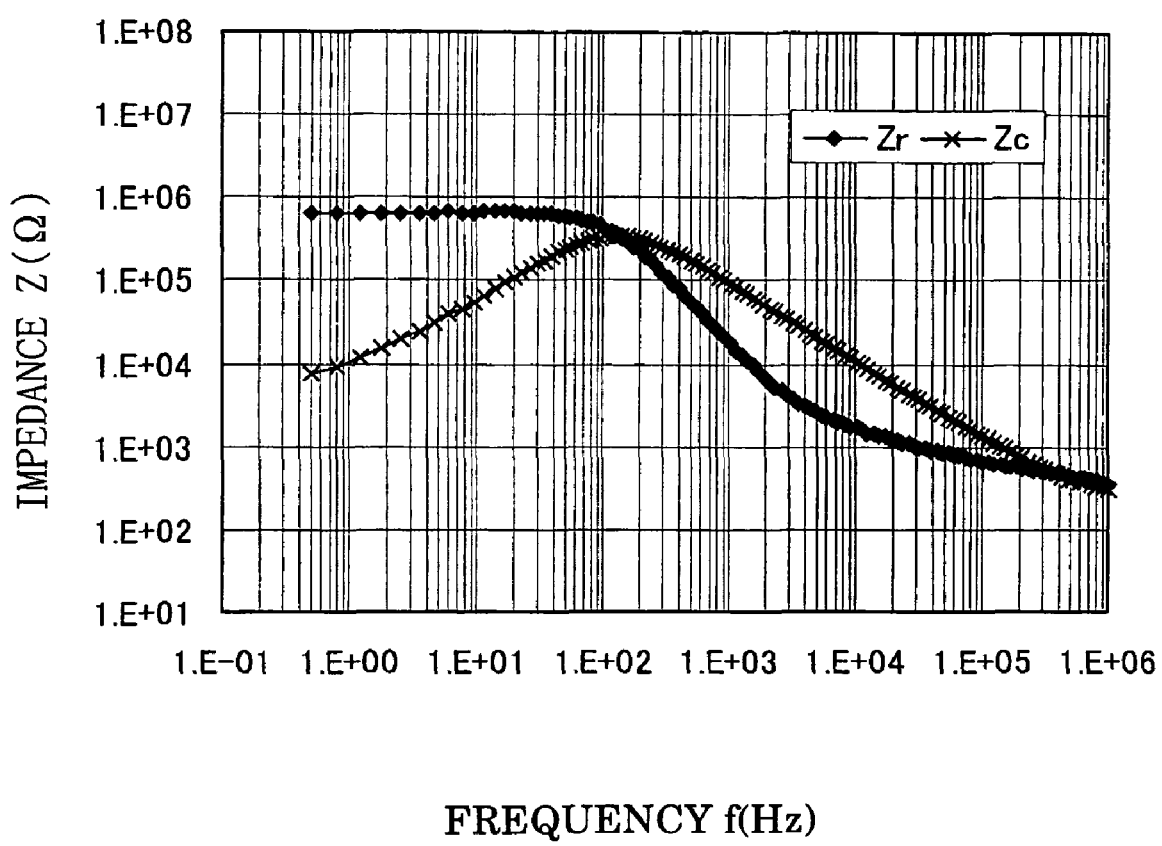
FIG. 13 is a view showing the frequency characteristics of an untreated product of Comparative Example 5.

Furthermore, the conductive roll of Comparative Example 5 obtained an evaluation indicating ununiform dispersion of carbon black. As shown in FIG. 6, rubber regions with carbon dropout (i.e., regions appearing black) as a result of reaggregation of carbon black were observed in large numbers.

Test Example 3

Measurement of Impedance

The conductive rolls of the respective Examples and Comparative Examples (except Comparative Example 1) (these conductive rolls will be referred to as treated products), and the corresponding conductive rolls before surface treatment (these conductive rolls will be referred to as untreated products) were measured for impedance characteristics by use of an impedance analyzer (Impedance Analyzer IM6e, a product of BHA). The measurements were made by applying a voltage of 0.2 V under a load of 500 g imposed at both ends of the roll in an N/N environment (25° C., 50% RH), and finding $Zr/Zc$, the ratio between the resistance component $Zr$ ($\Omega$) and the capacitive reactance component $Zc$ ($\Omega$), from impedance $Z$ ($\Omega$) at an alternating frequency of 1 Hz. The results are shown in Table 3. The frequency characteristics of Examples 1 to 3 and Comparative Examples 2 to 5 are shown in FIGS. 7 to 13.

TABLE 3

|  |  | Ex. 1 | Ex. 2 | Ex. 3 | Comp. Ex. 2 | Comp. Ex. 3 | Comp. Ex. 4 | Comp. Ex. 5 |
|---|---|---|---|---|---|---|---|---|
| Zr/Zc | Untreated product | 5.45 | 17.83 | 20.23 | 3.02 | 2.37 | 32.54 | 55.62 |
|  | Treated product | 7.24 | 1.98 | 2.30 | 4.51 | 2.13 | 13.15 | 14.82 |

The above results showed that the untreated products of Examples 1 to 3 had Zr/Zc falling within the range of 5 to 25, demonstrating the satisfactory dispersed state of carbon. In Comparative Example 2, probably because of pinholes, Zr/Zc was less than 5. In Comparative Example 3, carbon aggregated because of heat, and the structure developed greatly, thus resulting in Zr/Zc of less than 5. In Comparative Example 4, probably because of reaggregation of carbon, Zr/Zc exceeded 25, confirming the dispersed state to be slightly poor. In Comparative Example 5, probably because of further reaggregation of carbon, Zr/Zc exceeded 25 markedly, confirming the dispersed state to be poor. The surface treatment layers of the treated products undergoing surface treatment were polished, and similarly measured for impedance. The values of Zr/Zc were confirmed to be comparable to those of the untreated products.

Although the preferred embodiments of the present invention have been described in detail, it should be understood that various changes, substitutions and alterations can be made therein without departing from the spirit and scope of the invention as defined by the appended claims.

What is claimed is:

1. A conductive roll having at least one conductive elastic layer on an outer periphery of a core bar, the conductivity of the elastic layer being provided by carbon black,
   wherein the conductive elastic layer is prepared by reacting, in a mold, three components consisting of a polyol, a diisocyanate and a catalyst wherein the polyol consists essentially of a polyether-based polyol having an average functional group number of 2.5 or more per molecule and is reacted with the diisocyanate having an average functional group number of more than 2 per molecule at an NCO/OH mol ratio of less than 1 in the presence of a catalytic amount of tetravalent organotin-based compound having a tin content of 18.7% or less by weight and wherein the organotin-based compound has sulfur atoms bound adjacent to tin atoms, wherein the organotin-based compound is selected from the group of dibutyltin bisisononyl-3-mercaptopropionate and dibutyltin bisisooctylthioglycollate, wherein the organotin-based compound is 0.001 to 0.05% by weight based on said polyol.

2. The conductive roll according to claim 1, including a surface treatment layer on a surface of said conductive elastic layer, said surface treatment layer being formed by surface treatment with a surface treating solution containing at least an isocyanate component.

3. The conductive roll according to claim 2, wherein said surface treating solution further contains at least one of carbon black and at least one polymer selected from the group consisting of an acrylic fluorine-based polymer and an acrylic silicone-based polymer.

4. The conductive roll according to claim 1, wherein a relation between a resistance component Zr ($\Omega$) and a capacitive reactance component Zc ($\Omega$) calculated from impedance Z ($\Omega$) when an alternating voltage of 0.2 V having a frequency of 1 Hz is applied to said conductive elastic layer satisfies the following equation:

$$25 \geq Zr/Zc \geq 5.$$

5. A method for producing a conductive roll having at least one conductive elastic layer on an outer periphery of a core bar, said conductive elastic layer being granted conductivity by carbon black, comprising:
   reacting a polyol consisting essentially of a polyether-based polyol having an average functional group number of 2.5 or more per molecule with a diisocyanate having an average functional group number of more than 2 per molecule at an NCO/OH mol ratio of less than 1 in the presence of a catalytic amount of a tetravalent organotin-based compound having a tin content of 18.7% or less by weight to prepare said conductive elastic layer and wherein the organotin-based compound has sulfur atoms bound adjacent to tin atoms, wherein the organotin-based compound is selected from the group of dibutyltin bisisononyl-3-mercaptopropionate and dibutyltin bisisooctylthioglycollate, wherein the catalytic amount of said organotin-based compound is 0.001 to 0.05% by weight based on said polyol.

6. The method for producing a conductive roll according to claim 5, further comprising a step of forming a surface treatment layer on a surface of said conductive elastic layer by surface treatment with a surface treating solution containing at least an isocyanate component.

7. The method for producing a conductive roll according to claim 6, wherein said surface treating solution further contains at least one of carbon black and at least one polymer selected from the group consisting of an acrylic fluorine-based polymer and an acrylic silicone-based polymer.

8. The method for producing a conductive roll according to claim 5, wherein a relation between a resistance component Zr ($\Omega$) and a capacitive reactance component Zc ($\Omega$) calculated from impedance Z ($\Omega$) when an alternating voltage of 0.2 V having a frequency of 1 Hz is applied to said conductive elastic layer satisfies the following equation:

$$25 \geq Zr/Zc \geq 5.$$

* * * * *